A. Pope, Jr.,
Halter,
N° 77,317. Patented Apr. 28, 1868.
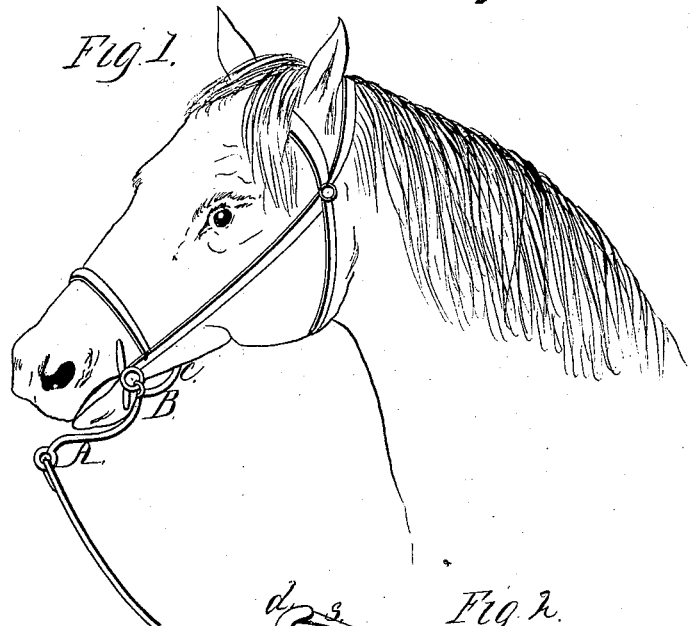
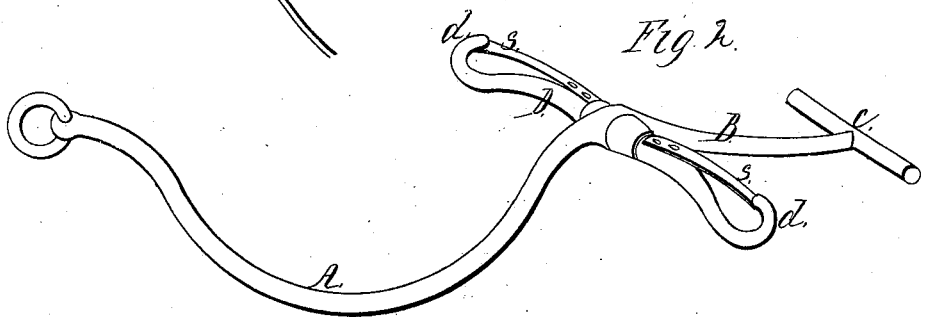
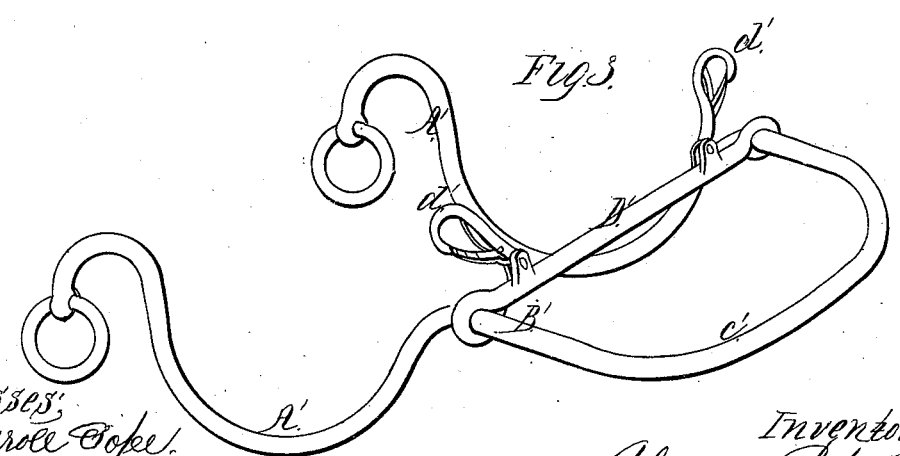
Witnesses:
Wm Carroll Pope
M. S. G. Wilde
Inventor:
Alexander Pope, Jr.

United States Patent Office.

ALEXANDER POPE, JR., OF DORCHESTER, MASSACHUSETTS.

Letters Patent No. 77,317, dated April 28, 1868.

---

IMPROVED DEVICE FOR PREVENTING HORSES FROM DRAGGING WEIGHTS.

---

*The Schedule referred to in these Letters Patent and making part of the same.*

---

Be it known that I, ALEXANDER POPE, Jr., of Dorchester, in the county of Norfolk, and State of Massachusetts, have invented a new and improved Curb for Horses, of which the following is a full, clear, and exact description, reference being had to the accompanying drawings, making a part of this specification, in which—

Figure 1 represents the device embodying my improvement in its mode of application to a horse's mouth.

Figure 2 represents the device on an enlarged scale; and

Figure 3 is a modification of my invention.

The object of my invention is mainly to provide a means for preventing a horse from dragging the weight which is attached by a strap to the bit-ring to hold him; and the invention consists of a curved rod, provided at one end with a short cross-piece, which is designed to fit on the under jaw of a horse in the rear of the mouth, which rod is attached loosely to a cross-bar, provided at each end with a snap-hook, so as to admit of its being readily attached to and detached from the rings of a horse's bit on each side, the front end of the said curved rod extending a short distance in front of the horse's mouth, so that when any downward pressure is exerted on the outer end of the rod, it will act as a lever on the cross-bar, for a fulcrum to press the rear cross-piece against the under side of the lower jaw of the horse, so that when a cord or strap, with a weight attached to one end, is secured to the front end of the curved rod, any attempt on the part of the horse to move and drag the weight will, by means of the pressure exerted by the cross-bar on his under jaw, cause him to desist and stand quiet.

Referring to the drawings, A B represent a curved bar, of the general form shown. At its rear end is a short cross-piece, C. At a point nearer its rear end is jointed or swivelled a cross-bar, D, having at each end a snap-hook, *d s*, so that it can be easily attached to the rings of a horse's bit, as shown in fig. 1.

The front end of the rod extends forward a little beyond the horse's mouth, and the rear cross-piece C is designed to fit against the under jaw or a little in the rear of the mouth.

The rod A B is secured to the centre of the cross-bar D, so as to allow of a free motion on the same, and to act as a lever, with the cross-bar D as a fulcrum, so that when a downward pressure is exerted upon the front end of the rod A, to which the weight is attached by a strap or cord, the cross-piece C will be forced against the under jaw of the horse. The more force used, the greater will be the pressure on the horse, who will naturally seek to relieve himself of it by backing and releasing the tension of the strap.

A comparatively light weight may thus be used, and will be sufficient to check the inclination of the horse to move.

The device may be secured to the strap that carries the weight, and is easily attached to or detached from the bit-rings, when necessary, so as to be carried about with the weight in the vehicle to which the horse is harnessed.

Figure 3 is a modification of my invention, and consists of a rod with two sides, A A, and forming a curve, C' in the rear, and attached to a cross-rod, D', to which are pivoted two snap-hooks *d*. This form is designed to be used as an ordinary curb, so as to be readily attached to a horse's bit, the curb-reins being attached to the rings on the outer ends. It may also be used to prevent a horse from "cribbing," when properly applied.

What I claim as my invention, and desire to secure by Letters Patent, is—

1. The bar or lever A B, provided with a cross-piece, *c*, or its equivalent, in combination with cross-bar D, substantially as and for the purposes specified.

2. I also claim the swivelled bar D, provided with the fastenings *d s*, as and for the purpose set forth.

3. I also claim the attachment to a horse's bit of the lever A B and swivelled cross-bar D, as and for the purpose described.

In testimony whereof, I have signed my name to this specification in the presence of two subscribing witnesses.

ALEXANDER POPE, JR.

Witnesses:
J. H. ADAMS,
WM. CARROLL POPE.